US007019300B2

(12) United States Patent
Watanabe

(10) Patent No.: US 7,019,300 B2

(45) Date of Patent: Mar. 28, 2006

(54) RADIATION IMAGE TAKING APPARATUS

(75) Inventor: Tetsuo Watanabe, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 245 days.

(21) Appl. No.: 10/719,387

(22) Filed: Nov. 20, 2003

(65) Prior Publication Data

US 2004/0101107 A1 May 27, 2004

(30) Foreign Application Priority Data

Nov. 27, 2002 (JP) ............................ 2002-343411

(51) Int. Cl.
*H01L 25/00* (2006.01)

(52) U.S. Cl. ............................ 250/370.08; 250/370.09

(58) Field of Classification Search ........... 250/370.08, 250/370.09

See application file for complete search history.

(56) References Cited

U.S. PATENT DOCUMENTS 4,457,010 A * 6/1984 Jenkins et al. .............. 378/167
2002/0090055 A1* 7/2002 Zur et al. ................... 378/154

* cited by examiner

*Primary Examiner*—David Porta
*Assistant Examiner*—Mindy Vu
(74) *Attorney, Agent, or Firm*—Morgan Finnegan LLP

(57) ABSTRACT

A radiation image taking apparatus includes a case that contains a radiation detecting unit that has a detection surface in which a photoelectric conversion element that detects a radiation transmitted through an object is located, a grid unit which is detachably attachable to an outside of the case and removes a scattered radiation, and a photo timer unit which is detachably attachable to the outside of the case and measures a dose of the radiation. One of a first mode in which the grid unit is attached to the case, a second mode in which the photo timer unit is attached to the case, and a third mode in which the grid unit is attached to the second mode can be freely used in configuration.

7 Claims, 5 Drawing Sheets

35
15c
18
15
16
11
12
1
3
31
33a
33
33b
32
34

2
33
3
21
22
31
23
17
16
24
22b
15b
15
11a
11b
11c
12
13
14
15a
11
1

RADIATION IMAGE TAKING APPARATUS

BACKGROUND OF THE INVENTION

1. Field of the Invention

The present invention relates to a portable radiation image taking apparatus which is constructed such that a grid and a photo timer are attachable to the outside of a case.

2. Related Background Art

Up to now, in general, an apparatus that emits a radiation to an object and detects an intensity distribution of the radiation transmitted through the object to obtain a radiation image of the object has been widely used in an industrial nondestructive testing and a field of medical diagnosis. As a general method for the above image taking, there is an X-ray film/screen method. This is a method of conducting image taking using a combination of a photosensitive film and a phosphor sensitive to an X-ray. A sheet-shaped rare earth phosphor that emits light when it is irradiated with the X-ray is held in contact with both surfaces of the photosensitive film. The X-ray transmitted through the object is converted into visible light by the phosphor and the visible light is captured in the photosensitive film. A latent image formed on the photosensitive film can be visualized by development using chemical treatment.

On the other hand, along With a recent progress in digital techniques, a method of converting a radiation image into an electrical signal, image-processing the electrical signal, and then reproducing the image-processed electrical signal as a visible image on a CRT or the like to obtain a high quality radiation image is required. With respect to such a method of converting the radiation image into the electrical signal, there has been proposed a radiation image recording and reproducing system as described in JP 55-012429 A, JP 56-011395 A, or the like, in which a radiation transmission image is temporarily stored as a latent image in the phosphor and the phosphor is irradiated with excitation light such as laser light later to photoelectrically read out the latent image and output it as a visible image.

Also, along with a recent progress in semiconductor process techniques, an apparatus that similarly takes a radiation image using a semiconductor sensor has been developed. Because such a system has a much wider dynamic range than that in the conventional radiation photography system using a photosensitive film, there is an economic advantage that a radiation image which is not influenced by a variation in radiation exposure amount can be obtained. Simultaneously, as compared with the conventional photosensitive film method, there is an advantage that chemical treatment is unnecessary and an output image can be immediately obtained.

FIG. 7 shows a conventional example of such a radiation image taking apparatus. An image taking unit 103 of an X-ray image taking apparatus includes an X-ray detection sensor 104. An object 102 is irradiated with an X-ray generated by an X-ray generating apparatus 101. The X-ray transmitted through the object 102 is detected by photoelectric conversion elements which are arranged in two-dimensional grid in the X-ray detection sensor 104. An image signal outputted from the X-ray detection sensor 104 is processed into a digital image by an image processing unit 107 and an X-ray image of the object is displayed on a monitor 108.

A scattered X-ray removing grid (hereinafter referred to as a grid) 105 is provided in the inner portion of the image taking unit 103. The grid 105 is used for removing a scattered X-ray produced in the inner portion of the object (for example, a human body) by the X-ray irradiation to improve a contrast of the X-ray image. In the case where image taking is conducted, the grid 105 is located between an X-ray tube and a detector such as a photosensitive film.

FIG. 8 is a schematic sectional view of the grid. The X-ray is emitted from the A-direction on the left side in FIG. 8. In the grid 105, foils 201 made of a material having a large X-ray absorbency index and intermediate materials 202 having a small X-ray absorbency index are alternately laminated. In general, lead is used for the foils 201 having the large X-ray absorbency index. In addition, aluminum, paper, wood, a synthetic resin, a carbon fiber reinforced resin, or the like is used as the intermediate material 202 having the small X-ray absorbency index. The periphery of the laminate is covered with a cover made of aluminum, a carbon fiber reinforced resin, or the like, which is indicated by reference numeral 200.

In many cases, the grid 105 is a convergent grid. That is, a central foil which is represented by reference symbol 201*a* and located immediately under an X-ray source (the X-ray generating apparatus 101) is perpendicular to the cover 200. Foils represented by foils 201*b* are slanted at larger angles toward the X-ray source as their positions are closer to the end of the grid. In the case of the convergent grid, it is necessary to conduct image taking while adjusting a distance between the grid and the X-ray source and aligning the center of the grid and the center of the X-ray source with each other. On the other hand, there is a grid in which the foils are not slanted. This is called a linear grid.

Also, a photo timer for X-ray dose measurement (hereinafter referred to as a photo timer) 106 is provided in the inner portion of the image taking unit 103. The purpose of using the photo timer 106 is to measure a dose of an X-ray which actually reaches the detector (the X-ray detection sensor 104) in order to obtain a preferable image by adjusting it to a desirable X-ray dose. In addition, the purpose of using the photo timer 106 is to prevent a person to be examined from being exposed to a large dosage of X-rays. The photo timer 106 is used for terminating the generation of the X-ray in the X-ray generating apparatus 101 when the measured X-ray dose reaches a predetermined value. Therefore, the photo timer 106 is located between the grid 105 and the detector (X-ray detection sensor 104).

Up to now, such a kind of image pickup apparatus has been placed in a radiation room and used therein. However, in recent years, in order to enable image taking at a high speed and on a wide range section, a potable type image taking apparatus (which is also called an electronic cassette) is desired.

It is required that such an electronic cassette is thin and light in weight and has a high mechanical strength. In the image taking using the cassette, there is the case where the person to be examined mounts the cassette. In addition, there is a fear that an impact such as a drop or a collision is applied to the cassette due to its portability. Therefore, it is necessary to greatly improve a mechanical strength as compared with a conventional stationary image taking unit.

A schematic structure of the electronic cassette will be described with reference to a side cross section shown in FIG. 9. With respect to the electronic cassette used for the above-mentioned X-ray image taking, an X-ray detection panel 111 is two-dimensionally fixed onto a base 112 made of a metal in order to improve a strength with respect to a static pressure and bending. Further, an outer covering unit 114 is constructed so as to store the X-ray detection panel 111, the base 112, a circuit board 113 that processes electrical signals, and the like. In order to obtain a mechanical strength, a metal is used also for the outer covering unit 114. Note that, because a reduction in weight is also required, a light metal such as aluminum or magnesium is employed. In addition, a cover 115 made of a material such as a CFRP having preferable X-ray permeability is provided on an X-ray incident surface side.

A scattered radiation amount depends on the structure of the object. For example, in the case of a human body, the scattered radiation amount is large in the chest and the abdomen and is relatively small in the arms and legs. Here, because the grid reduces an X-ray transmitting therethrough, the image taking without using the grid can be conducted at a dose smaller than in the case where the image taking is conducted using the grid. Therefore, in many cases, the grid is used for conducting the image taking on a section in which the scattered radiation amount is large because an image quality is given a high priority, and the image taking without the grid is conducted on a section in which the scattered radiation amount is relatively small in order to reduce a dose. In addition, an optimum grid specification is changed according to a section.

It is considered that the cassette is used for various sections. Accordingly, it is desirable that the grid is constructed so as to be easily detachably attachable according to a section on which the image taking is conducted. In the case of the conventional stationary type, a detachably attachable mechanism for the grid can be constructed in the image taking unit without causing a problem. However, in the case of the electronic cassette, it is disadvantageous that an opening portion for grid attachment and detachment is provided in a portion of the outer covering unit in view of a strength.

On the other hand, in the case of the chest and the abdomen, a dose of the X-ray which reaches the X-ray detection panel 111 is generally changed depending on the body shape (fat content) of the person to be examined. Therefore, the photo timer is used in many cases. However, in the case of the image taking of the arms and legs and the like or the cassette image taking in doctor's rounds or the like, the frequency in use of the photo timer is low. Thus, it is desirable that the photo timer for the electronic cassette is detachably attachable. In addition, if the photo timer is attached, the thickness of the entire cassette increases by the thickness of the photo timer. Thus, in the case where the cassette is placed below the person to be examined, it is not desirable to attach the photo timer to the cassette.

In the conventional techniques as described above, it is desirable to provide a radiation image taking apparatus which is constructed such that a grid and a photo timer are selectively detachably attachable to an image taking unit and includes the image taking unit which is thin and light in weight, and has a high mechanical strength with respect to a static pressure, bending, an impact, and the like.

SUMMARY OF THE INVENTION

According to one aspect of the present invention, there is provided a radiation image taking apparatus comprising:

a radiation detecting unit that has a detection surface in which a photoelectric conversion element is arranged, and converts a radiation into an electrical signal;

a case that contains the radiation detecting unit;

a grid unit which includes a grid that removes a scattered radiation and a grid frame; and a photo timer unit which includes a photo timer that measures a dose of the radiation and a photo timer frame, wherein:

the grid unit is detachably attachable to the case through the grid frame, and the photo timer unit is detachably attachable to the case through the photo timer frame; and one of a first mode in which the grid unit is attached to the case, a second mode in which the photo timer unit is attached to the case, and a third mode in which the grid unit is attached in the second mode can be used.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

DESCRIPTION OF THE PREFERRED EMBODIMENTS

A preferred embodiment of the present invention will be described in detail in accordance with the accompanying drawings.

The present invention will be described in detail with reference to embodiments shown in FIGS. 1 to 6.

Figure 1:
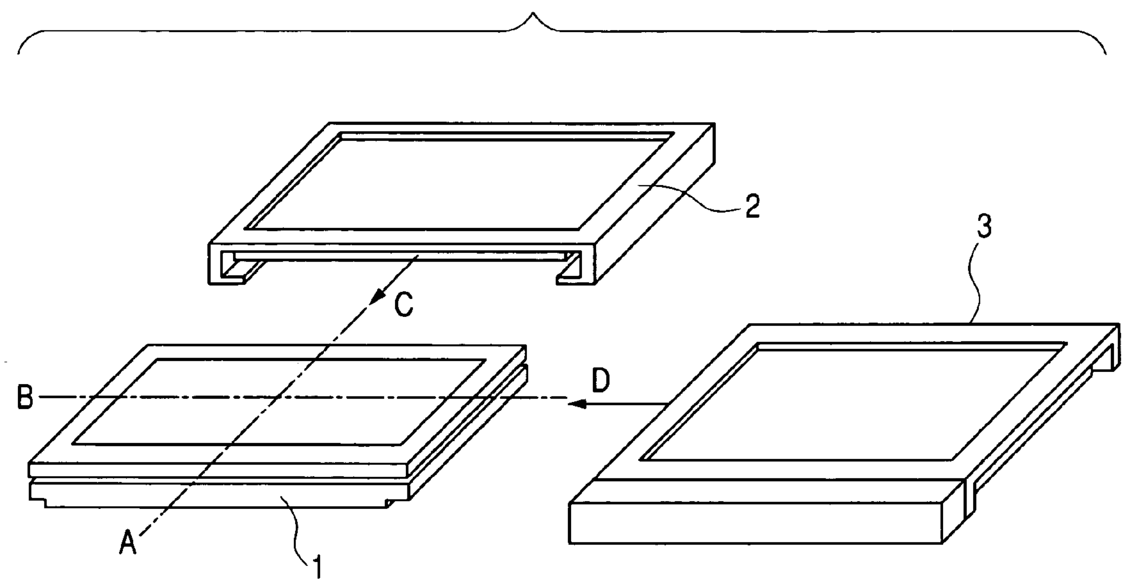
FIG. 1 is a structural view of a first embodiment.
Figure 2:
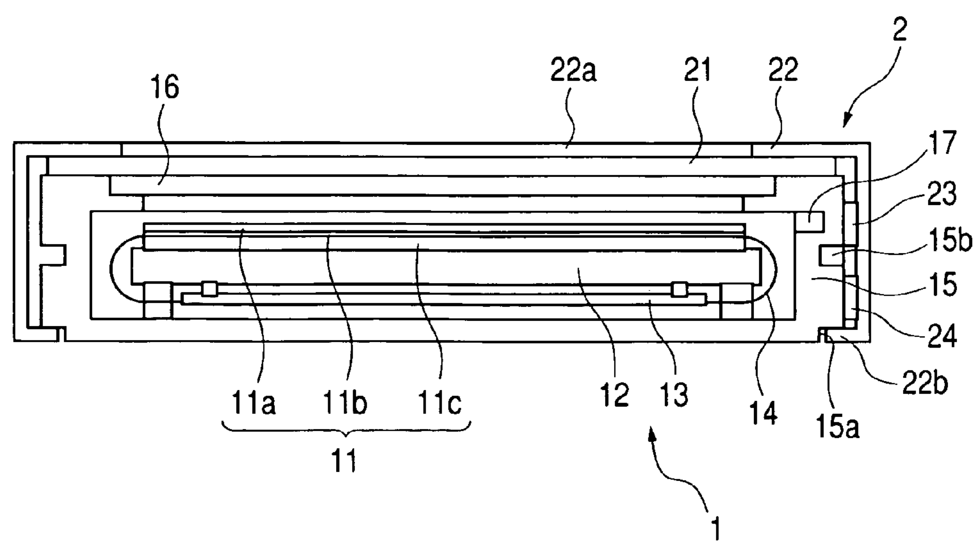
FIG. 2 is a side cross sectional view of a first mode in which a grid module is attached to an image taking unit according to the first embodiment.
Figure 3:
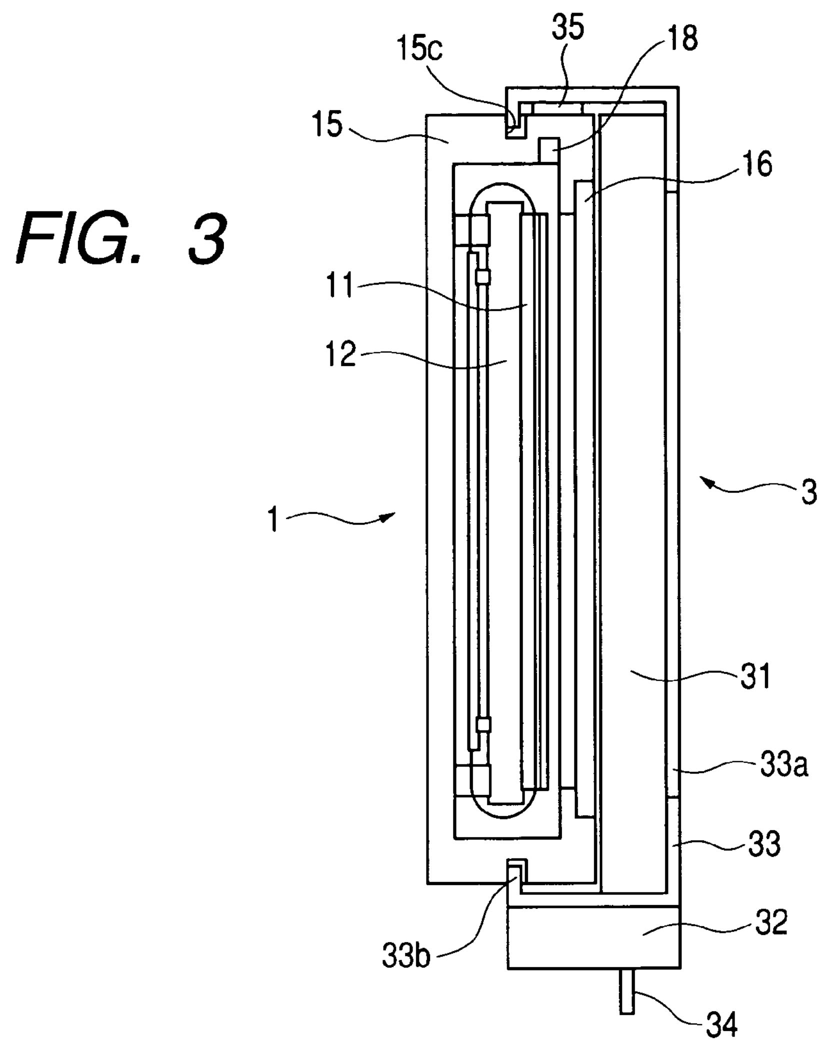
FIG. 3 is a side cross sectional view of a second mode in which a photo timer module is attached to the image taking unit according to the first embodiment.
Figure 4:
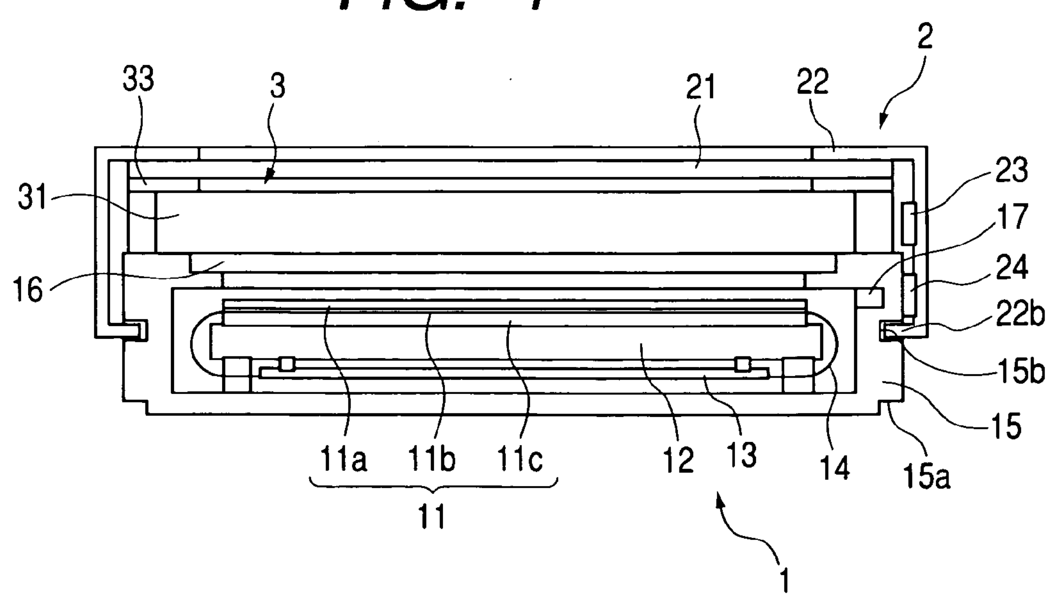
FIG. 4 is a side cross sectional view of a third mode in which the grid module is attached to the image taking unit according to the second mode of the first embodiment.

FIGS. 1 to 4 show an X-ray image taking apparatus according to a first embodiment of the present invention. FIG. 1 is a structural view of this embodiment. FIG. 2 is a side cross sectional view of a first mode in which a grid module is attached to an image taking unit. FIG. 3 is a side cross sectional view of a second mode in which a photo timer module is attached to the image taking unit. FIG. 4 is a side cross sectional view of a third mode in which the grid module is attached to the image taking unit according to the second mode.

In FIG. 1, the X-ray image taking apparatus includes an image taking unit 1, a grid module 2 for scattered radiation removal, and a photo timer module 3 for radiation dose measurement. In this embodiment, it is possible to obtain the first mode in which the image taking unit 1 and the grid module 2 are combined, the second mode in which the image taking unit 1 and the photo timer module 3 are combined, and the third mode in which the second mode and the grid module 2 are combined.

First, the first mode will be described with reference to FIG. 2. FIG. 2 is a cross sectional view taken along the line B shown in FIG. 1.

An X-ray detection panel 11 is composed of a fluorescent screen 11*a*, photoelectric conversion elements 11*b*, and a substrate 11*c*. A glass substrate is used as the substrate 11*c* in many cases. This is because it is required that no chemical action with a semiconductor element is produced, there is a resistance to a temperature of a semiconductor process, and a size is stabilized. The photoelectric conversion elements 11*b* are formed in two-dimensional arrangement on the above-mentioned glass substrate by a semiconductor process. A resin plate to which a phosphor of a metallic compound is applied is used as the fluorescent screen 11*a* and integrally formed with the substrate 11*c* by bonding.

The X-ray detection panel 11 having such a structure is fixed onto a base 12 made of a metal. A circuit board 13 that processes photoelectrically converted electrical signals is connected with the photoelectric conversion elements 11*b* through a plurality of flexible print circuit boards 14.

In the flexible print circuit boards 14, signal lines and control lines which are used for reading electrical signals from the photoelectric conversion elements 11*b* are wired. The flexible print circuit boards 14 are arranged in the outer region of the substrate 11*c*. Each of the flexible print circuit boards 14 is led to the circuit board 13 located on the rear surface of the base 12 through the side of the base 12. Thus, an X-ray image detection unit is completed.

The X-ray image detection unit is contained in the inner portion of a case main body 15 and fixed to the case main body 15 through a support portion of the base 12. The X-ray image detection unit is hermetically sealed by a case cover 16 having X-ray permeability. Thus, the image taking unit 1 is constructed.

The grid module 2 is composed of a grid main body 21 and a frame 22 made of a metal. As described above, because the grid main body 21 has a layer structure in which an X-ray shield and an intermediate material with a low X-ray absorption are formed, the mechanical strength of the grid main body 21 is low. Therefore, the frame 22 made of the metal in which an opening portion 22*a* for X-ray transmission is formed is mounted as a reinforcing frame to the grid main body 21. Both sides of the frame 22 in the cross section are bent so as to be a substantially U-shape. Bending ends 22*b* guide the image taking unit 1 so as to attach the grid module 2 to the image taking unit 1 in the C-direction shown in FIG. 1 while the bending part ends 22*b* fit with step portions 15*a* or groove portions 15*b* which are provided in the image taking unit 1. Here, because the grid module 2 is directly attached to the image taking unit 1, the bending part ends 22*b* are engaged with the step portions 15*a*. When the grid module 2 is attached to the image taking unit 1, the grid module 2 is engaged therewith by a biasing member (not shown) in which a resistance acts in the through direction.

A detector 17 in the inner portion of the image taking unit 1 and a detection member 23 inside the frame 22 of the grid module 2 are located to oppose to each other at the engaging position. When the detection member 23 is detected by the detector 17, the completion of the attachment of the grid module 2 is recognized. In terms of specific configurations thereof, there are cited a magnet as the detection member 23 and a reed switch turned on/off by a magnetic force as the detector 17. Accordingly, information indicating whether or not the grid module 2 is attached is simply obtained. In addition, a bar code index can be used as the detection member 23 and a line sensor can be used as the detector 17. In this case, information related to a specification, such as a grid type can be also obtained. The information obtained by the detector 17 is sent as an image taking condition to a control unit side. Or it is possible to have a function of a control unit to the image taking unit 1 and to also make information record in the inner portion of the image taking unit 1. Such information can be automatically recorded together with image information so that the convenience of an operator can be improved.

Next, the second mode will be described with reference to FIG. 3. FIG. 3 is a cross sectional view taken along the line A shown in FIG. 1.

A photo timer is composed of a detection unit 31 and an amplifying unit 32 that amplifies signals, and mounted onto a frame 33 made of a metal in which an opening portion 33*a* for X-ray transmission is formed. The amplifying unit 32 is connected with a cable 34 for the photo timer, thereby connecting with an X-ray generating apparatus. The X-ray generating apparatus conducts a sequence in which X-ray irradiation is stopped when a predetermined radiation dose threshold value is detected.

As in the case of the frame 22 of the grid module 2, both upper and lower ends of the frame 33 of the photo timer module 3 within the cross section are bent so as to be a substantially U-shape, and inserted to groove portions 15*c* provided in the case main body 15 of the image taking unit 1. The photo timer module 3 is guided along the groove portions 15*c* in the D-direction shown in FIG. 1 by ends 33*b* of the frame 33 and attached to the image taking unit 1. In the attachment state, a detector 18 and a detection member 35 are located to oppose to each other. Therefore, as in the case of the grid module 2, the completion of the attachment thereof or specification information can be recognized.

Further, the third mode will be described with reference to FIG. 4. FIG. 4 is a cross sectional view taken along the line B shown in FIG. 1.

As described in the conventional example, the third mode corresponds to the case where both the grid module and the photo timer module are used. With respect to the structure, the photo timer module 3 is formed above the image taking unit 1 and the grid module 2 is formed above the photo timer module 3. In other words, the grid module 2 is attached to the second mode described above.

The grid module 2 is constructed so as to engage with one set of two opposite sides with respect to the square radiation incident surface of the image taking unit 1. In addition, the photo timer module 3 is constructed so as to engage with the other set of two opposite sides with respect to the square radiation incident surface of the image taking unit 1. Therefore, in the second mode in which the photo timer module 2 is attached, the opposite sides of the image taking unit 1 which are engaged with the grid module 2 are exposed to the outside. Here, in contrast to the first mode, the bending part ends 22*b* of the frame 22 of the grid module 2 are inserted to the grove portions 15*b* to attach the grid module 2 to the image taking unit 1. The groove portions 15*b* are formed at positions corresponding to a height at which the photo timer module 3 is attached to the image taking unit 1. Therefore, the image taking unit 1, the grid module 2, and the photo timer module 3 are combined to obtain the layer structure as shown in FIG. 4. Because an additional detection member 24 is located at a position opposite to the detector 17, the attachment states of both the photo timer module 3 and the grid module 2 can be recognized in this case.

Figure 5:
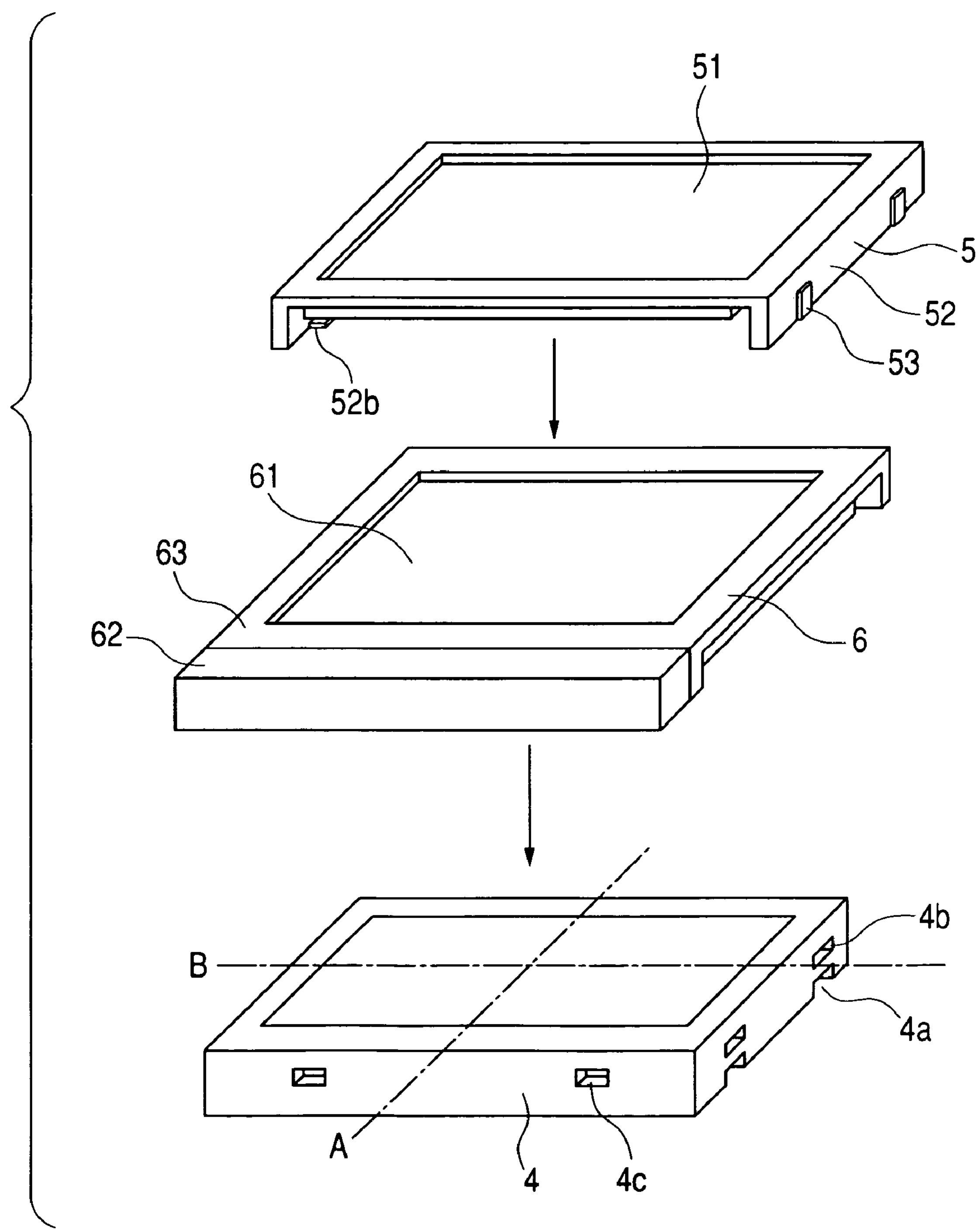
FIG. 5 is a structural view of a second embodiment.
Figure 6:
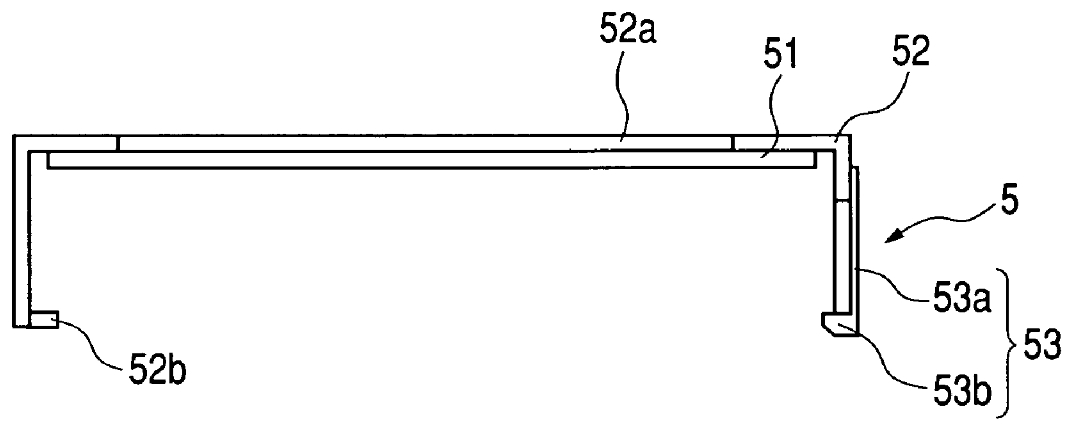
FIG. 6 is a side cross sectional view of a grid module according to the second embodiment.
Figure 7:
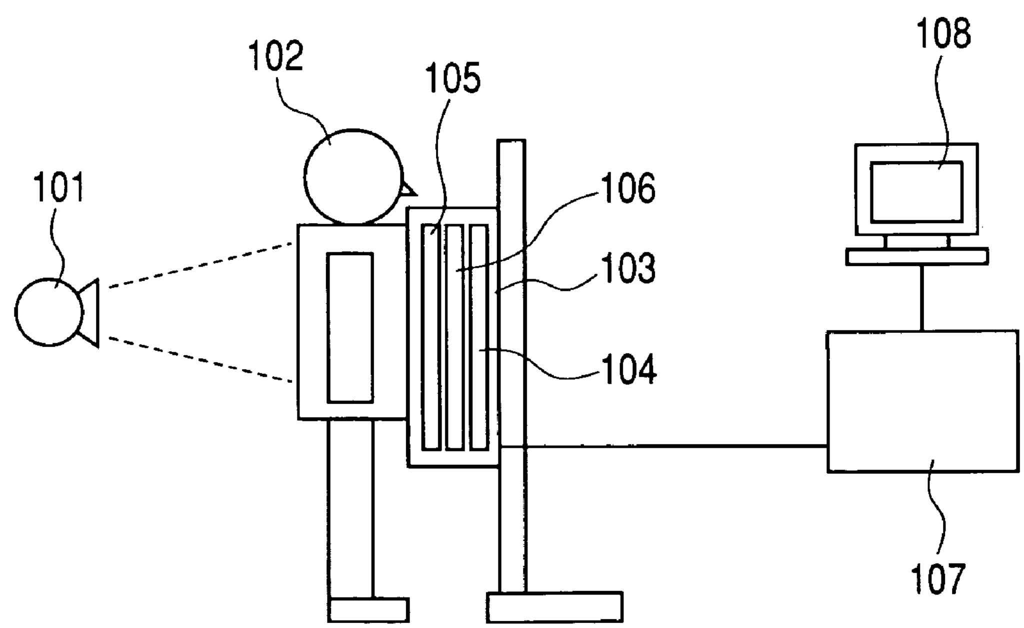
FIG. 7 is a structural view of a conventional example.
Figure 8:
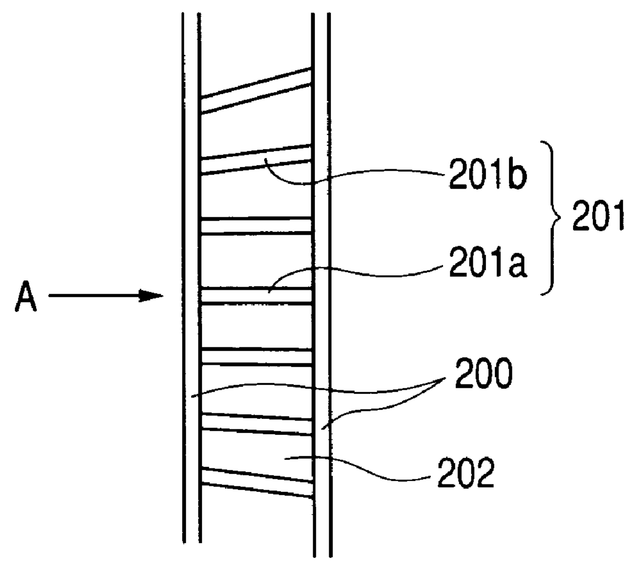
FIG. 8 is a cross sectional view of a grid.
Figure 9:
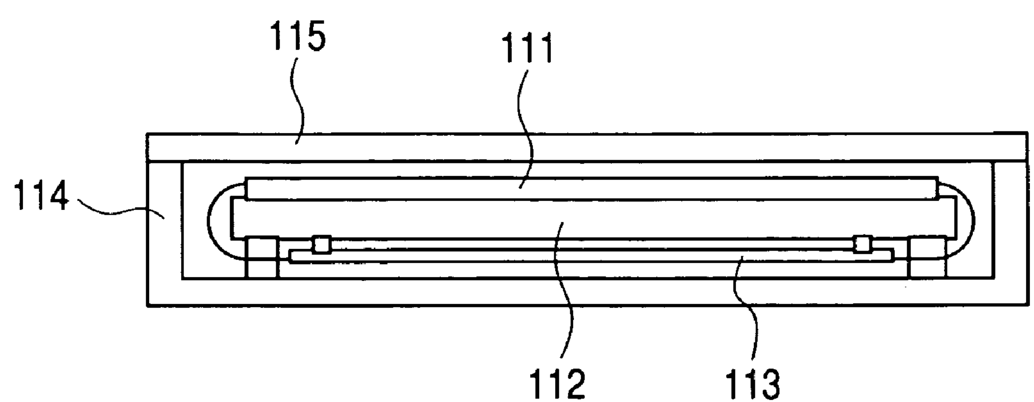
FIG. 9 is a side cross sectional view of an image taking unit of the conventional example.

Next, a second embodiment will be described with reference to FIGS. 5 and 6. FIG. 5 is a structural view of the second embodiment and FIG. 6 is a side cross sectional view of a grid module according to the second embodiment.

In the first embodiment, it is constructed such that the grid module 2 and the photo timer module 3 are attached to or detached from the image taking unit in the side direction of the image taking unit 1. In the case where the radiation image taking apparatus is attached to the base with a standing position or a recumbent position for use, there is the case where the grid module and/or the photo timer module cannot be attached or detached because of no side space. Therefore, in the second embodiment, it is constructed such that a grid module 5 and a photo timer module 6 are detachably attachable to the image taking unit in the X-ray incident direction.

First, the grid module 5 will be described by way of example. FIG. 6 is a cross sectional view taken along the line B shown in FIG. 5. A grid 51 is two-dimensionally fixed onto a frame 52 which is made of a metal and has an opening portion 52*a*. In FIG. 6, two protruding portions 52*b* which are bent so as to be a substantially U-shape are provided in the left end. On the other hand, two engaging members 53 are provided in the right end to a bending portion of the frame 52 which is bent in the vertical direction. Each of the engaging members 53 is composed of an elastic portion 53*a* which vertically extends and a convex portion 53*b* formed in the end of the bending portion.

Recesses 4*a* and 4*b* which are engaged with the grid module 5 are formed in the side of an image taking unit 4. Although only one side is shown in FIG. 5, the identical recesses are formed on the opposite side. In the case of the attachment, first, the protruding portions 52*b* are inserted into the recesses. After that, the grid module 5 is overlapped on the image taking unit 4 while the grid module 5 is rotated about the protruding portions 52*b*. At this time, the engaging members 53 are warped by the elastic property of the elastic portion 53*a*, so that the convex portion 53*b* is inserted into the recesses.

Similarly, the photo timer module 6 can be also attached to the image taking unit 4 through recesses 4*c*. In addition, the selection of the recesses 4*a* and 4*b* which are required for attaching the grid module 5 can be conducted according to whether or not the photo timer module 6 is attached. The photo timer module 6 is composed of a detection unit 61 and an amplifying unit 62 that amplifies signals, and mounted onto a frame 63 made of a metal.

Therefore, as in the first embodiment, the grid module 5 is constructed so as to engage with one set of two opposite sides with respect to the square radiation incident surface of the image taking unit 4. In addition, the photo timer module 6 is constructed so as to engage with the other set of two opposite sides with respect to the square radiation incident surface of the image taking unit 4. Thus, combinations of the first mode to the third mode can be realized.

As described above, according to the present invention, the radiation image taking apparatus is constructed such that the grid module and the photo timer module are selectively detachably attachable from the outside to the image taking unit. Therefore, it is unnecessary to provide the image taking unit with an opening portion for grid module attachment and detachment and an opening portion for photo timer module attachment and detachment. In addition, the image taking unit which is thin and light in weight and has a high mechanical strength can be realized. Thus, the radiation image taking apparatus can be applied to various image taking modes. In addition, a relatively low cost system can be provided, in which image taking using the stationary type, image taking in doctor's rounds, and the like are covered with a single image taking unit.

OTHER EMBODIMENT

Note that the present invention may be applied to either a system constituted by a plurality of apparatuses (e.g., an image processing apparatuses, interfaces, radiographic apparatuses, X-ray generation apparatuses, and the like) or an arrangement that integrates an image processing apparatus and a radiographic apparatus, or the like.

The present invention is not limited to the above embodiments and various changes and modifications can be made within the spirit and scope of the present invention. Therefore to apprise the public of the scope of the present invention, the following claims are made.

What is claimed is:

1. A radiation image taking apparatus, comprising:

a radiation detecting unit that has a detection surface in which a photoelectric conversion element is arranged, and converts a radiation into an electrical signal;

a case that contains the radiation detecting unit;

a grid unit which includes a grid that removes a scattered radiation and a grid frame; and a photo timer unit which includes a photo timer that measures a dose of the radiation and a photo timer frame, wherein:

the grid unit is detachably attachable to the case through the grid frame, and the photo timer unit is detachably attachable to the case through the photo timer frame; and one of a first mode in which the grid unit is attached to the case, a second mode in which the photo timer unit is attached to the case, and a third mode in which the grid unit is attached in the second mode can be used.

2. An apparatus according to claim 1, wherein the grid unit is engaged with first opposite sides of the case and the photo timer unit is engaged with second opposite sides of the case which are different from the first opposite sides.

3. An apparatus according to claim 1, wherein a distance between the grid and the detection surface in the first mode is different from a distance between the grid and the detection surface in the third mode.

4. An apparatus according to claim 1, wherein the case comprises detection means for detecting whether or not at least one of the grid unit and the photo timer unit is attached.

5. An apparatus according to claim 4, wherein the detection means can recognize identification information of at least one of the grid and the photo timer.

6. An apparatus according to claim 5, further comprising recording means for recording information obtained by the detection means as image taking information.

7. An apparatus according to claim 1, wherein the frame of the grid unit and the frame of the photo timer unit are made of a metal.

* * * * *